(12) United States Patent
Hakkaku

(10) Patent No.: US 11,040,484 B2
(45) Date of Patent: Jun. 22, 2021

(54) BUILDING APPARATUS AND BUILDING METHOD

(71) Applicant: MIMAKI ENGINEERING CO., LTD., Nagano (JP)

(72) Inventor: Kunio Hakkaku, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 138 days.

(21) Appl. No.: 16/180,018

(22) Filed: Nov. 5, 2018

(65) Prior Publication Data

US 2019/0143598 A1    May 16, 2019

(30) Foreign Application Priority Data

Nov. 16, 2017  (JP) .............................. JP2017-221350

(51) Int. Cl.
| | | |
|---|---|---|
| *B29C 64/35* | (2017.01) | |
| *B29C 64/112* | (2017.01) | |
| *B29C 64/218* | (2017.01) | |
| *B33Y 40/00* | (2020.01) | |

(Continued)

(52) U.S. Cl.
CPC .......... *B29C 64/135* (2017.08); *B29C 64/112* (2017.08); *B29C 64/209* (2017.08);

(Continued)

(58) Field of Classification Search
CPC ..... B29C 64/35; B29C 64/112; B29C 64/218; B29C 64/209; B29C 64/357; B33Y 40/00;

(Continued)

(56) References Cited

U.S. PATENT DOCUMENTS

| | | | | |
|---|---|---|---|---|
| 5,724,888 A | * | 3/1998 | Okuda | ............... B41J 2/325 |
| | | | | 101/116 |
| 2006/0034636 A1 | * | 2/2006 | Kosuge | ............... G03G 15/025 |
| | | | | 399/176 |

(Continued)

FOREIGN PATENT DOCUMENTS

JP    2015071282    4/2015

OTHER PUBLICATIONS

Vacuum Filtration Apparatus—Büchner Funnel (Wikipedia search for Büchner funnel: https://en.wikipedia.org/w/index.php?title=B%C3%BCchner_funnel&oldid=744581271), which was available on public on Oct. 16, 2016 or before. (Year: 2016).*

(Continued)

*Primary Examiner* — Leith S Shafi
*Assistant Examiner* — Inja Song
(74) *Attorney, Agent, or Firm* — JCIPRNET

(57) ABSTRACT

A building apparatus for building a three-dimensional object includes: an inkjet head that ejects ink as a building material; a scanning driver that causes the inkjet head to perform a scanning operation of moving relative to the object being built; a flattening roller that flattens a layer of the ink; and an ink removal unit that removes, from the flattening roller, the ink that is scraped off by the flattening roller. The ink removal unit includes a flow channel formation unit that forms a flow channel of fluid that enables the ink adhering to the flattening roller to be removed by causing the fluid for removing the ink to flow out or flow in, and removes the ink from the flattening roller without scraping off the ink from the flattening roller. Hence, flattening the layer of the building material more appropriately.

10 Claims, 6 Drawing Sheets

(51) Int. Cl.
 *B33Y 10/00* (2015.01)
 *B33Y 30/00* (2015.01)
 *B29C 64/209* (2017.01)
 *B29C 64/135* (2017.01)
(52) U.S. Cl.
 CPC ............ *B29C 64/218* (2017.08); *B33Y 10/00* (2014.12); *B33Y 30/00* (2014.12); *B33Y 40/00* (2014.12)
(58) Field of Classification Search
 CPC .. B33Y 10/00; B33Y 30/00; B41J 2/00; B41J 2/005; B41J 2/01; B41J 2/17; B41J 2/175; B41J 2/17596; B41J 2/18; B41J 2002/1853; B41J 2002/1856; B41J 11/04; G06K 15/00; Y10S 222/01
 See application file for complete search history.

(56) References Cited

U.S. PATENT DOCUMENTS

| | | | | |
|---|---|---|---|---|
| 2008/0111847 A1* | 5/2008 | Kojima | ............... | B41J 2/2139 347/19 |
| 2008/0236480 A1* | 10/2008 | Furukawa | ............... | C23C 26/02 118/50 |
| 2012/0134721 A1* | 5/2012 | Abe | ............... | G03G 15/0818 399/265 |
| 2015/0273762 A1* | 10/2015 | Okamoto | ............... | B33Y 10/00 428/423.1 |
| 2016/0176119 A1* | 6/2016 | Thresh | ............... | B29C 64/218 264/39 |
| 2016/0236422 A1* | 8/2016 | Sakura | ............... | B22F 3/1055 |
| 2017/0028638 A1* | 2/2017 | Evans | ............... | B29C 70/382 |
| 2017/0165753 A1* | 6/2017 | Buller | ............... | B29C 64/188 |
| 2017/0165909 A1* | 6/2017 | Hakkaku | ............... | B29C 64/218 |
| 2018/0141126 A1* | 5/2018 | Buller | ............... | G03G 15/224 |

OTHER PUBLICATIONS

Vacuum Filtration Apparatus—Büchner Flask (Wikipedia search for Büchner flask: https://en.wikipedia.org/w/index.php?title=B%C3%BCchner_flask&oldid=679112161), which was available on public on Sep. 2, 2015 or before. (Year: 2015).*

* cited by examiner

BUILDING APPARATUS AND BUILDING METHOD

CROSS REFERENCE TO RELATED APPLICATIONS

This application claims the priority benefit of Japanese Patent Application No. 2017-221350, filed on Nov. 16, 2017. The entirety of the above-mentioned patent application is hereby incorporated by reference herein and made a part of this specification.

BACKGROUND OF THE INVENTION

Technical Field

The present invention relates to a building apparatus, a building method, and an object.

Background Art

In the related art, there is known a building apparatus (3D printer) that builds an object using an inkjet head (for example, refer to Patent Literature 1). In such a building apparatus, for example, the object is built through additive manufacturing by overlapping a plurality of layers of ink formed by the inkjet head.

Patent Literature 1: Japanese Patent Application Laid-open No. 2015-71282

SUMMARY

In a case of building an object by additive manufacturing, it is preferable that each layer of ink is appropriately formed to have a thickness that is set in accordance with resolution of building. In this case, at the time of forming each layer of the ink, the layer of the ink may be flattened by using a flattening roller. More specifically, in this case, for example, the ink to be cured under a predetermined condition (for example, UV curable ink) is used as a building material, and part of the ink before curing is scraped off with the flattening roller to flatten the layer of the ink.

In a case of flattening the layer of the ink as described above, the ink adhering to the surface of the flattening roller needs to be appropriately removed. Thus, in this case, the ink adhering to the surface of the flattening roller may be removed by using a blade, for example. However, in this case, various problems may be caused when the flattening roller is brought into physical contact with the blade and the like. For example, as for the flattening roller and the blade, a metal member may be used. In this case, by performing a flattening operation, the flattening roller and the blade are worn away. As a result, the blade and the like need to be periodically replaced. In a case in which the flattening roller is brought into contact with the blade as described above, the surface of the flattening roller may be damaged. In this case, due to influence of the damage, an unintended streak and the like may be generated in the shape of the object. Thus, at the time of building the object, it is preferable to flatten a layer of the building material more appropriately. The present invention provides a building apparatus and a building method that can solve the above problems.

The inventor of the present invention has made vigorous investigation as to a method of flattening the layer of the building material. To solve the problem caused in the method of using the blade and the like, the inventor has conceived to remove the ink adhering to the surface of the flattening roller in a non-contact state with the flattening roller. The non-contact state with the flattening roller means a state in which a solid member is not brought into contact with the surface of the flattening roller, for example. In this case, the inventor has conceived to remove the ink adhering to the surface of the flattening roller by pouring fluid with various configurations. Through further vigorous investigation, the inventor has found a characteristic required for obtaining such an effect, and made the present invention.

To solve the above problems, the present invention provides a building apparatus for building a three-dimensional object by depositing a layer formed with a building material in a deposition scanning direction set in advance, the building apparatus including: an ejection head that ejects the material; a scanning driver that causes the ejection head to perform a scanning operation of moving relative to the object being built, and causes the ejection head to perform the scanning operation in an in-plane direction orthogonal to the deposition scanning direction to cause the ejection head to form the layer; a flattening member that flattens the surface by being brought into contact with a surface of the layer and scraping off the material; and an adhering material removal unit that removes, from the flattening member, the material that is scraped off by the flattening member, wherein the adhering material removal unit includes a flow channel formation unit that forms a flow channel of fluid for enabling removal of the material adhering to the flattening member by causing the fluid for removing the material to flow in or flow out through the flow channel, and the material is removed from the flattening member without scraping off the material from the flattening member by using the fluid caused to flow out or flow in by the flow channel formation unit.

In this configuration, the flattening member is, for example, a flattening roller. In this case, removing the material from the flattening member means removing a material adhering to the surface of the flattening roller, for example. The surface of the flattening roller means, for example, a portion of the flattening roller to be brought into contact with the object being built. The building material used, for example, is a material that is liquid at the time of ejection, and cured in accordance with a predetermined condition thereafter (for example, UV curable ink). In this case, for example, at the time of forming each layer, part of the material in a liquid state (uncured) is scraped off with the flattening roller to flatten the layer.

In this configuration, removing the material from the flattening member without scraping off the material from the flattening member means removing the material adhering to the flattening member while preventing a solid member used for scraping from being brought into contact with the flattening member, for example. In a case of using the flattening roller as the flattening member, preventing the solid member from being brought into contact with the flattening member means preventing the solid member from being brought into contact with the surface of the flattening roller, for example. Preventing the solid member from being brought into contact with the surface of the flattening roller means, for example, preventing the solid member from being brought into contact with the surface of the flattening roller, the solid member required for removing the building material (ink and the like) adhering to the surface of the flattening roller. Thus, the solid member used for a purpose other than the purpose of removing the building material adhering to the surface of the flattening roller may be brought into contact with the surface of the flattening roller as needed.

The adhering material removal unit is, for example, arranged at a position separated from the flattening member to keep a state not in contact with the surface of the flattening member. In this case, the position of the adhering material removal unit means a position of the solid member constituting the adhering material removal unit. With this configuration, for example, the building material adhering to the flattening member can be appropriately removed while preventing another solid member from being brought into contact with the flattening member. Due to this, for example, the layer of the building material can be flattened more appropriately.

A specific method of removing the building material adhering to the flattening member used, for example, is a method of sucking the building material using a pump and the like. In this case, for example, the adhering material removal unit removes the building material from the surface of the flattening roller by sucking the material on the surface of the flattening roller from the position separated from the flattening roller. With this configuration, for example, the building material can be appropriately removed from the surface of the flattening roller in a non-contact state with the flattening roller. In this case, the sucking operation with the pump can be considered to be an operation of pouring fluid. The pump can be considered to be an example of a flow channel formation unit. In this case, for example, the sucking operation of the pump can be considered to be an example of an operation of forming a flow channel of fluid.

In this case, the adhering material removal unit is, for example, a configuration including a pump and a suction container may be used. In this case, as for the pump, for example, a pump for sucking air may be used. The suction container used, for example, is a container the internal pressure of which is reduced when the pump sucks air. The suction container sucks, for example, the material adhering to the flattening member when the internal pressure of the suction container is reduced. With this configuration, the pump does not directly suck the building material. The pump can suck the building material by using a decompressed environment caused by the suction of the air in the pump. In this case, for example, as compared with a case of directly sucking the building material with a pump, the pump can be used more stably. Due to this, for example, failure and the like of the pump can be prevented, and a service life of the pump can be appropriately prolonged.

In a case of sucking the building material using the pump and the like, suction may be performed while blowing air to the surface of the flattening roller, for example. In this case, as for the adhering material removal unit, for example, a configuration further including a suction nozzle and a gas blowing unit may be used. The suction nozzle is, for example, a nozzle that sucks the building material on the surface of the flattening roller. The gas blowing unit is, for example, a configuration of moving the building material on the surface of the flattening roller by blowing pressurized gas (compressed air and the like) to the surface of the flattening roller. In this case, the gas blowing unit blows air to the flattening roller from a position separated therefrom so as to serve as an air knife, for example, to move the building material such that the building material is peeled off from the surface of the flattening roller. For example, the suction nozzle sucks the building material moved by the gas blown from the gas blowing unit, and sends the building material to the suction container. With this configuration, for example, the building material can be sucked more efficiently and appropriately.

For example, the gas blowing unit may blow air pressurized by the pump to the surface of the flattening roller. In this case, for example, the pump reduces the internal pressure of the suction container, and pressurizes the sucked air. With this configuration, for example, air blowing force of the gas blowing unit and sucking force of the suction nozzle can be balanced easily and appropriately. In this case, by using one pump for suction and air blowing, the configuration of the adhering material removal unit can be simplified.

The gas blowing unit may be used not only in a configuration of sucking the building material, but also in a configuration in which suction is not performed. In this case, for example, by blowing gas with the gas blowing unit, the material on the surface of the flattening roller is moved. In this case, for example, by moving the building material to a predetermined collection position or a collection route, the building material may be removed from the surface of the flattening roller. Also with this configuration, for example, the building material can be appropriately removed from the surface of the flattening roller. In this case, the operation of blowing air can be considered to be the operation of pouring fluid. The gas blowing unit can be considered to be an example of the flow channel formation unit. In this case, for example, the air blowing operation performed by the gas blowing unit can be considered to be an example of an operation of forming a flow channel of the fluid.

The operation of pouring the fluid performed to remove the building material from the flattening member, for example, is an operation of supplying liquid other than the building material to the surface of the flattening member may be used. In this case, for example, low viscosity liquid and the like may be used, the low viscosity liquid being liquid that lowers viscosity of the building material. More specifically, in this case, used is a configuration including a liquid supplying unit as the adhering material removal unit, for example. For example, the liquid supplying unit supplies the low viscosity liquid to the surface of the flattening member from a position separated from the flattening member. As for the low viscosity liquid, for example, cleaning liquid and the like matched with a characteristic of the building material can be preferably used. With this configuration, the building material can be removed more easily by lowering the viscosity of the building material using the low viscosity liquid. Thus, also with this configuration, for example, the building material can be appropriately removed from the surface of the flattening roller. In this case, the operation of supplying the low viscosity liquid can be considered to be the operation of pouring fluid. The liquid supplying unit can be considered to be an example of the flow channel formation unit. In this case, for example, the operation of supplying the cleaning liquid performed by the liquid supplying unit can be considered to be an example of the operation of forming a flow channel of the fluid.

In a case of using the flattening roller as the flattening member, to remove the ink adhering to the surface of the flattening roller while preventing the adhering material removal unit from being brought into contact with the flattening roller, for example, a gap retaining mechanism and the like may be further used, the gap retaining mechanism retaining the position of the adhering material removal unit at a position separated from a portion of the flattening roller to be brought into contact with the object being built. In this case, the flattening roller is a roller including an object contact part and a stepped part is used, for example. The object contact part is, for example, a portion to be brought into contact with the object being built. The stepped part is, for example, a portion that is stepped from the object contact part not to be brought into contact with the object being built. The gap retaining mechanism used, for example, is a configuration including a roller for adjusting a gap that is a roller used for adjusting the position of the adhering material removal unit. In this case, the position of the adhering material removal unit is, for example, determined in accordance with a position of a rotation center of the roller for adjusting a gap. For example, the roller for adjusting a gap rotates while being in contact with the stepped part of the flattening roller to retain the position of the adhering material removal unit at a position separated from the portion of the flattening roller to be brought into contact with the object being built. With this configuration, for example, the position of the adhering material removal unit can be appropriately retained.

As the configuration of the present invention, a building method having the same characteristic as that described above may be used. Also in this case, for example, the same effect as that described above can be obtained.

According to the present invention, for example, the layer of the building material can be flattened more appropriately.

BRIEF DESCRIPTION OF THE DRAWINGS

FIG. 1A illustrates an example of a configuration of a principal part of the building apparatus 10. FIG. 1B illustrates an example of a configuration of a head 12 in the building apparatus 10.

FIG. 2A illustrates an example of a configuration of a principal part of the flattening unit 106 in a comparative configuration. FIG. 2B illustrates an example of the entire configuration of the flattening unit 106.

FIG. 3A illustrates an example of a configuration of a principal part of the flattening unit 106 according to this example. FIG. 3B illustrates an example of the entire configuration of the flattening unit 106.

FIG. 4A illustrates an example of a configuration of the flattening unit 106 according to the present modification. FIG. 4B illustrates a vicinity of a distal end of a suction nozzle 406 in an enlarged manner.

FIGS. 5A and 5B illustrate an example of a configuration of a vicinity of the gap retaining mechanism 206 in the flattening unit 106.

FIGS. 6A and 6B illustrate an example of a detailed configuration of the blowing nozzle 420. FIGS. 6C and 6D are diagrams for explaining an effect of blowing air by the blowing nozzle 420.

DESCRIPTION OF EMBODIMENTS

Figure 1A:
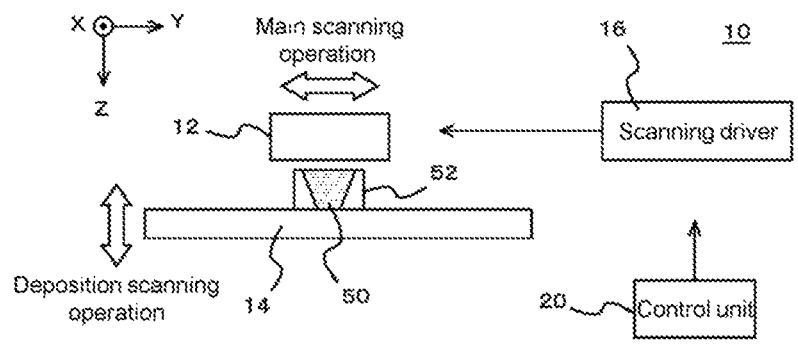
FIGS. 1A and 1B are diagrams illustrating an example of a building apparatus 10 according to an embodiment of the present invention.
Figure 1B:
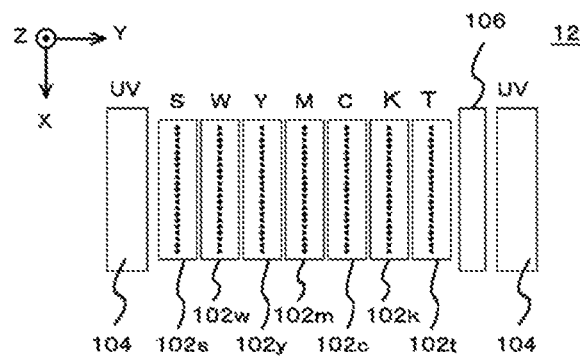

The following describes an embodiment of the present invention with reference to the drawings. FIGS. 1A and 1B illustrate an example of a building apparatus 10 according to an embodiment of the present invention. FIG. 1A illustrates an example of a configuration of a principal part of the building apparatus 10. FIG. 1B illustrates an example of a configuration of a head 12 in the building apparatus 10.

Except the points described below, the building apparatus 10 may have a characteristic that is the same as or similar to that of a known building apparatus. More specifically, except the points described below, the building apparatus 10 may have a characteristic that is the same as or similar to that of a known building apparatus that performs building by ejecting droplets as a material of an object 50 by using an inkjet head. The building apparatus 10 may further include various configurations required for building the object 50, for example, in addition to the illustrated configuration.

In this example, the building apparatus 10 is a building apparatus (3D printer) that builds the three-dimensional object 50 through additive manufacturing. In this case, the additive manufacturing is, for example, a method of building the three-dimensional object 50 by depositing a layer formed with a building material in a deposition scanning direction set in advance. The object 50 is, for example, a three-dimensional structure. In this example, the building apparatus 10 includes a head 12, a stage 14, a scanning driver 16, and a control unit 20.

The head 12 is a portion that ejects droplets as a material of the object 50. In this case, an ink means, for example, a functional liquid. In this example, the ink can be considered to be, for example, a liquid ejected from the inkjet head. In this case, the inkjet head means, for example, an ejection head that ejects ink droplets using an inkjet system. More specifically, the head 12 ejects, through a plurality of inkjet heads, ink as the material of the object 50 to be cured in accordance with a predetermined condition. By curing the ink after landing, layers constituting the object 50 are overlapped to be formed. In this example, the ink used is a UV curable ink (UV ink) that is a liquid and can be cured by being irradiated with ultraviolet rays. The UV curable ink is an example of material that is liquid when being ejected and is cured in accordance with a predetermined condition after ejection.

The head 12 further ejects a material of a support layer 52 in addition to the material of the object 50. Due to this, the head 12 forms the support layer 52 around the object 50 as needed. The support layer 52 is, for example, a deposition structure that surrounds an outer circumference of the object 50 being built to support the object 50. The support layer 52 can be considered to be, for example, a deposition structure and the like formed under a portion having an overhanging shape at the time of building such as a case of building the object 50 having an overhanging shape. The support layer 52 is formed as needed at the time of building the object 50, and is removed after the building is completed.

The stage 14 is a table-like member that supports the object 50 being built, arranged at a position opposed to the inkjet head in the head 12, and has an upper surface on which the object 50 being built is placed. In this example, the stage 14 has a configuration in which at least the upper surface thereof can move in a deposition scanning direction (Z-direction in the drawing). When being driven by the scanning driver 16, the stage 14 causes at least the upper surface thereof to move following the progress of building of the object 50. In this case, for example, the deposition scanning direction is a direction in which the building material is deposited in additive manufacturing. More specifically, in this example, the deposition scanning direction is a direction orthogonal to a main scanning direction (Y-direction in the drawing) and a sub scanning direction (X-direction in the drawing).

The scanning driver 16 is a driver that causes the head 12 to perform a scanning operation of moving relative to the object 50 being built. In this case, for example, moving relative to the object 50 means moving relative to the stage 14. Causing the head 12 to perform a scanning operation means, for example, causing the inkjet heads included in the head 12 to perform the scanning operation. In this example, the scanning driver 16 causes the head 12 to perform a main scanning operation (Y-scanning), a sub scanning operation (X-scanning), and a deposition scanning operation (Z-scanning).

The main scanning operation means, for example, an operation of ejecting the ink while moving in the main scanning direction relative to the object 50 being built. In this example, the scanning driver 16 causes the head 12 to move while fixing the position of the stage 14 in the main scanning direction, and causes the head 12 to perform the main scanning operation. For example, the scanning driver 16 may cause the object 50 to move by causing the stage 14 to move while fixing the position of the head 12 in the main scanning direction.

The sub scanning operation means, for example, an operation of moving relative to the object 50 being built in the sub scanning direction orthogonal to the main scanning direction. More specifically, for example, the sub scanning operation is an operation of moving relative to the stage 14 in the sub scanning direction by a feeding amount set in advance. In this example, the scanning driver 16 causes the stage 14 to move while fixing the position of the head 12 in the sub scanning direction during intervals in the main scanning operation to cause the head 12 to perform the sub scanning operation. Alternatively, the scanning driver 16 may cause the head 12 to move while fixing the position of the stage 14 in the sub scanning direction to cause the head 12 to perform the sub scanning operation.

In this example, the main scanning operation and the sub scanning operation are an example of a scanning operation in an in-plane direction orthogonal to the deposition scanning direction. The scanning driver 16 causes the head 12 to perform the main scanning operation and the sub scanning operation to form each layer of the ink, which is deposited by additive manufacturing, on the head 12. For example, the scanning driver 16 causes the head 12 to perform deposition scanning operation every time each layer of the ink is formed.

The deposition scanning operation means, for example, an operation of causing the head 12 to move relative to the object 50 being built in the deposition scanning direction. The scanning driver 16 causes the head 12 to perform the deposition scanning operation following the progress of the building operation to adjust a relative position of the inkjet head with respect to the object 50 being built in the deposition scanning direction. Alternatively, in the deposition scanning operation according to this example, the scanning driver 16 causes the stage 14 to move while fixing the position of the head 12 in the deposition scanning direction. The scanning driver 16 may cause the head 12 to move while fixing the position of the stage 14 in the deposition scanning direction.

The control unit 20 is, for example, a CPU of the building apparatus 10, and controls respective units of the building apparatus 10 to control the building operation in the building apparatus 10. More specifically, the control unit 20 controls the respective units of the building apparatus 10 based on, for example, shape information and color information on the object 50 to be built. According to this example, the object 50 can be appropriately built.

Subsequently, the following describes a more specific configuration of the head 12. In this example, the head 12 includes a plurality of inkjet heads, a plurality of UV light sources 104, and part of a flattening unit 106. In this case, "the head 12 includes part of a flattening unit 106" means that a partial configuration of the flattening unit 106 is arranged in the head 12. As illustrated in FIG. 1B, as a plurality of inkjet heads, the head 12 includes an inkjet head 102$s$, an inkjet head 102$w$, an inkjet head 102$y$, an inkjet head 102$m$, an inkjet head 102$c$, an inkjet head 102$k$, and an inkjet head 102$t$. The ejection heads are, for example, arranged side by side in the main scanning direction while positions thereof are aligned in the sub scanning direction. Each of the inkjet heads includes, on a surface opposed to the stage 14, a nozzle array in which a plurality of nozzles are arranged side by side in a predetermined nozzle array direction. In this example, the nozzle array direction is a direction parallel with the sub scanning direction.

Among these inkjet heads, the inkjet head 102$s$ is an inkjet head that ejects ink as a material of the support layer 52. The material of the support layer 52 is, for example, a known material for a support layer can be preferably used. The inkjet head 102$w$ is an inkjet head that ejects ink of white (W). In this example, white ink is an example of light-reflective ink and is used, for example, to form a region (light-reflective region) having a light-reflecting property in the object 50. The inkjet head 102$y$, the inkjet head 102$m$, the inkjet head 102$c$, and the inkjet head 102$k$ are inkjet heads for coloring for use in building a colored object 50. More specifically, the inkjet head 102$y$ ejects yellow (Y) ink. The inkjet head 102$m$ ejects magenta (M) ink. The inkjet head 102$c$ ejects cyan (C) ink. The inkjet head 102$k$ ejects black (K) ink. In this case, each color of YMCK is an example of a process color used for full-color representation by subtractive color mixing. The inkjet head 102$t$ is an inkjet head that ejects clear ink. The clear ink is, for example, ink of clear color that is a colorless transparent color (T).

The UV light sources 104 are light sources (UV light source) for curing the ink, and generate ultraviolet rays that cure the UV curable ink. In the present example, the UV light sources 104 are respectively disposed on one end side and the other end side of the main scanning direction in the head 12, with the rows of the inkjet heads interposed therebetween. The UV light source 104 is, for example, an ultraviolet LED (UVLED) and the like can be preferably used. The UV light source 104, is a metal halide lamp, a mercury lamp, and the like may be used. In this example, the respective UV light sources 104 are arranged at one end side and the other end side of the main scanning direction of the head 12 to hold the inkjet heads 102$s$ to 102$t$ therebetween.

The flattening unit 106 is a configuration (flattening module) for flattening the layer of the ink that is formed while the object 50 is being built, and at the time of main scanning operation, for example, removes part of the ink before curing by being brought into contact with a surface of the layer of the ink to flatten the layer of the ink. As described above, in this example, only part of the flattening unit 106 is arranged in the head 12. More specifically, in this example, the flattening unit 106 includes a flattening roller and an ink removal unit. The flattening roller is a roller for flattening the layer of the ink. The ink removal unit is a configuration for removing the ink adhering to a surface of the flattening roller at the time of flattening the layer of the ink. In this case, the flattening roller and part of the ink removal unit are arranged in the head 12. The other part of the ink removal unit is arranged outside the head 12. A specific configuration of the flattening unit 106 will be described later in more detail.

Using the head 12 having the configuration described above, the layer of ink that forms the object 50 can be formed appropriately. Furthermore, a plurality of layers of ink are successively added so that the object 50 can be built appropriately. The specific configuration of the head 12 is not limited to the configuration described above and can be modified in various ways. For example, the head 12 may further include, as inkjet heads for coloring, inkjet heads for colors other than those described above. The arrangement of a plurality of inkjet heads in the head 12 can also be modified in various ways. For example, some of the inkjet heads may be displaced in the sub scanning direction from the other inkjet heads.

Subsequently, the following describes a specific configuration of the flattening unit 106 in more detail. For convenience of explanation, first, the following describes the flattening unit 106 having a configuration (hereinafter, referred to as a comparative configuration) different from that of the flattening unit 106 in this example.

Figure 2A:
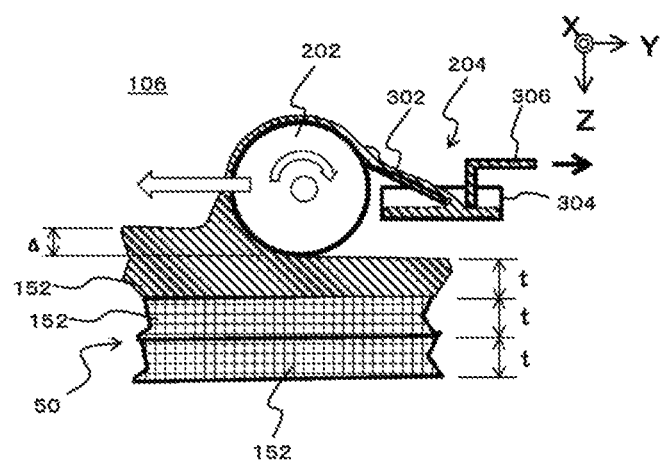
FIGS. 2A and 2B are diagrams for explaining a flattening unit 106 in a comparative configuration.
Figure 2B:
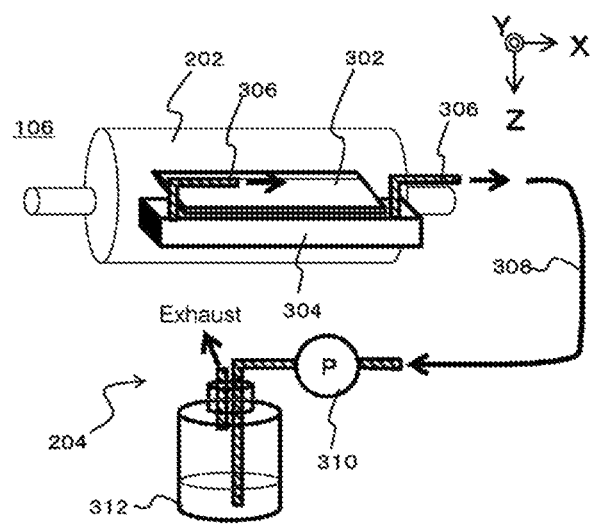

FIGS. 2A and 2B are diagrams for explaining the flattening unit 106 in the comparative configuration. FIG. 2A is a diagram illustrating an example of a configuration of a principal part of the flattening unit 106 in the comparative configuration, and illustrates an example of a configuration of a portion of the flattening unit 106 arranged in the head 12. FIG. 2B illustrates an example of the entire configuration of the flattening unit 106 including a portion arranged outside the head 12. In the comparative configuration, the flattening unit 106 includes a flattening roller 202 and an ink removal unit 204. The ink removal unit 204 includes a blade 302, a tray 304, an ink suction port 306, an ink suction route 308, a pump 310, and a collection container 312.

In this configuration, as illustrated in the drawing, for example, the flattening roller 202 rotates so that the surface thereof is brought into contact with the object 50 being built. Due to this, part of the ink in a liquid state before curing (uncured state) is scraped off, and the layer of the ink is flattened. More specifically, in this case, at the time of forming each layer of the ink, the ink is ejected so that a thickness of the layer is larger than a thickness t of one layer set in advance. By scraping off the ink of a portion exceeding the thickness t of one layer illustrated in the drawing as Δ, for example, the layer of the ink is flattened, and the layer of the ink the thickness of which is adjusted to be a predetermined thickness is formed. After flattening is performed by the flattening roller 202, ultraviolet rays are emitted by the UV light source 104 (refer to FIG. 1) to cure the ink.

In this case, the ink adhering to the surface of the flattening roller 202 at the time of flattening the layer of the ink is removed from the surface of the flattening roller 202 by the ink removal unit 204. More specifically, in the flattening unit 106 in the comparative configuration, the blade 302 is brought into contact with the surface of the flattening roller 202 to remove the ink adhering to the surface of the flattening roller 202. The removed ink is temporarily accumulated in the tray 304, and the ink accumulated in the tray 304 is sucked by the pump 310 via the ink suction port 306 and the ink suction route 308. The pump 310 sends the sucked ink to the collection container 312 on a downstream side. The collection container 312 is configured to be able to exhaust inside air, and appropriately exhausts air corresponding to an amount of the ink sent from the pump 310 to accumulate the ink therein. With this configuration, the ink can be appropriately removed from the surface of the flattening roller 202. Due to this, for example, flattening of the layer of the ink performed by using the flattening roller 202 can be appropriately performed.

However, in the flattening unit 106 according to the comparative configuration, various problems may be caused in relation to use of the blade 302. For example, in this case, as described above, the blade 302 and the flattening roller 202 may be worn away due to contact between the flattening roller 202 and the blade 302. More specifically, as for the flattening roller 202 and the blade 302, for example, a metal member may be used. In this case, for example, the blade 302 and the like need to be periodically replaced. In this case, due to contact with the blade 302, the surface of the flattening roller 202 may be damaged. In a case in which the surface of the flattening roller 202 is damaged, an unintended streak and the like may be generated in the object 50 due to influence of the damage.

In a case of a configuration using the blade 302, the ink is scraped off by taking off the ink on the surface of the flattening roller 202 with the blade 302. In this case, the ink that has been scraped off falls on the tray 304 by self-weight, and is accumulated in the tray 304. The ink accumulated in the tray 304 is sucked by the pump 310 via the ink suction port 306 and the like. However, in this case, for example, the ink may be solidified in the tray 304, or the ink suction port 306 may be clogged due to influence of sediment such as dust, and suction cannot be appropriately performed in some cases. In a case of a configuration using the blade 302, a position of a distal end of the blade 302 needs to fall within a certain range (a range of 90°) along a circumference of the flattening roller 202. Thus, limitation may be caused on the height and the like of the tray 304, and it may be difficult to cause a capacity of the tray 304 to be sufficiently large. In this case, for example, when the ink cannot be sufficiently sucked from the blade 302 due to clogging and the like of the ink suction port 306, the ink may overflow the tray 304 to be leaked onto the object 50, for example.

On the other hand, in this example, rather than using the blade 302 and the like to be brought into contact with the flattening roller 202, the ink is removed from the surface of the flattening roller 202 in what is called a non-contact state with the flattening roller 202. The following describes the configuration of the flattening unit 106 in this example in more detail. In this case, the flattening unit 106 in this example is, for example, the flattening unit 106 used in the building apparatus 10 described above with reference to FIGS. 1A and 1B.

Figure 3A:
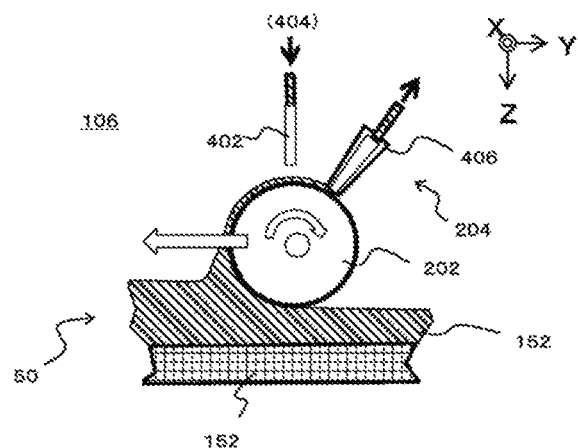
FIGS. 3A and 3B are diagrams for explaining the flattening unit 106 according to this example.
Figure 3B:
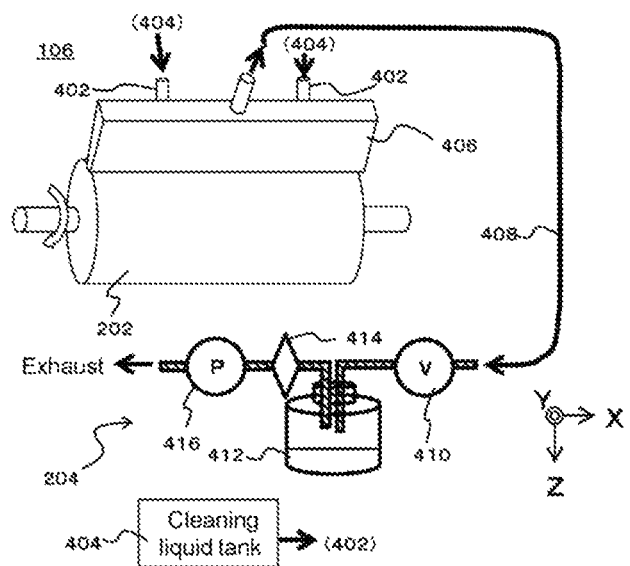

FIGS. 3A and 3B are diagrams for explaining the flattening unit 106 according to this example. FIG. 3A is a diagram illustrating an example of a configuration of a principal part of the flattening unit 106 according to this example, and illustrates a configuration of a portion of the flattening unit 106 arranged in the head 12 (refer to FIGS. 1A and 1B). FIG. 3B illustrates an example of the entire configuration of the flattening unit 106 including the portion arranged outside the head 12. Except the points described below, in FIGS. 3A and 3B, a component denoted by the same reference numeral as that in FIGS. 2A and 2B may have a characteristic that is the same as or similar to that of the component in FIGS. 2A and 2B.

In this example, the flattening unit 106 includes the flattening roller 202 and the ink removal unit 204. The ink removal unit 204 includes a cleaning nozzle 402, a cleaning liquid tank 404, a suction nozzle 406, an ink suction route 408, a valve 410, a collection container 412, a filter 414, and a pump 416. Among these components, the flattening roller 202, the cleaning nozzle 402, and the suction nozzle 406 are arranged in the head 12. The other components are arranged outside the head 12.

The flattening roller 202 is a roller for flattening the layer of the ink. By functioning in a way that is the same as or similar to the flattening roller 202 described above with reference to FIGS. 2A and 2B, for example, the flattening roller 202 scrapes off part of the ink before curing to flatten the layer of the ink. In this example, the ink removal unit 204 is an example of an adhering material removal unit, and has a configuration different from that of the flattening unit 106 illustrated in FIGS. 2A and 2B to remove the ink from the surface of the flattening roller 202 while preventing a solid member from being brought into contact with the surface of the flattening roller 202. The flattening roller 202 is an example of a flattening member that flattens the surface of the layer of the ink, and flattens the layer of the ink by being in contact with the surface of the layer of the ink and scraping off the ink. In this case, the ink removal unit 204 removes, from the surface of the flattening roller 202, the ink scraped off from the layer of the ink by the flattening roller 202.

More specifically, in the configuration of the ink removal unit 204 according to this example, the cleaning nozzle 402 is an example of a liquid supplying unit and a cleaning liquid supplying member, and supplies, to the surface of the flattening roller 202, cleaning liquid as liquid for facilitating removal of the ink from the surface of the flattening roller 202. In this case, facilitating removal of the ink from the surface of the flattening roller 202 means, for example, lowering the viscosity of the ink. In this case, for example, the cleaning liquid may be liquid and the like for cleaning a peripheral surface of the flattening roller 202. In this example, the cleaning liquid is an example of low viscosity liquid and the like that lower the viscosity of the ink.

The cleaning nozzle 402 supplies the cleaning liquid to a region before the ink is removed on the surface of the flattening roller 202. In this case, the region before the ink is removed on the surface of the flattening roller 202 means, as illustrated in the drawing for example, a region from a position at which the ink is scraped off to a position opposed to the suction nozzle 406 in a rotational direction of the flattening roller 202. By supplying the cleaning liquid to the region in this range, the viscosity of the ink adhering to the flattening roller 202 can be appropriately lowered. Due to this, for example, removal of the ink from the surface of the flattening roller 202 can be further facilitated.

In this example, the cleaning nozzle 402 supplies the cleaning liquid from a position separated from the flattening roller 202 to the surface of the flattening roller 202. In this case, it is preferable to use the cleaning liquid matched with the characteristic of the ink used for building. As for the cleaning liquid, colorless liquid is preferably used. With this configuration, for example, the color of the cleaning liquid can be appropriately prevented from influencing the object 50. More specifically, as for the cleaning liquid, for example, clear ink and the like can be preferably used. In this case, for example, the same ink as clear ink ejected from the inkjet head 102t (refer to FIGS. 1A and 1B) can be used as the cleaning liquid. In addition to the clear ink, for example, liquid and the like containing a component that is the same as or similar to a solvent component (solvent and the like) of the ink used for building may be used as the cleaning liquid. Depending on the characteristic of the ink, aside from a component and the like of the ink, for example, various alcohols and the like such as ethanol and IPA may be used as the cleaning liquid. In this example, the cleaning nozzle 402 receives the cleaning liquid from the cleaning liquid tank 404. The cleaning liquid tank 404 is a tank for supplying the cleaning liquid to the cleaning nozzle 402.

In the flattening unit 106 according to this example, the ink having viscosity that is lowered by supplying the cleaning liquid is sucked by using the suction nozzle 406. The suction nozzle 406 is an example of a suction member arranged at a position close to the flattening roller 202, arranged to be opposed to the surface of the flattening roller 202 at a position separated from the flattening roller 202 not to be brought into contact with the flattening roller 202, and sucks the ink on the surface of the flattening roller 202 (on a roller surface) to remove the ink from the surface of the flattening roller 202. In this case, the suction nozzle 406 used, as illustrated in FIG. 3B for example, is a configuration that is opposed to a range of the entire width of the flattening roller 202 and sucks the ink for the entire width at the same time. With this configuration, for example, the ink on the surface of the flattening roller 202 can be removed more appropriately. In this case, as for the suction nozzle 406, for example, it is preferable to use a nozzle and the like having a slit-like opening having a length in a longitudinal direction equal to or larger than the width of the flattening roller 202. In this example, the suction nozzle 406 is connected to the collection container 412 via the ink suction route 408 and the valve 410, and sucks the ink when the pressure in the collection container 412 is reduced.

The ink suction route 408 is a route for sending the ink sucked by the suction nozzle 406 to the outside of the head 12, and connects the suction nozzle 406 with the valve 410. The valve 410 is an electromagnetic valve arranged between the ink suction route 408 and the collection container 412, and opens and closes the route between the collection container 412 and the suction nozzle 406 by being opened and closed in accordance with control by the control unit 20 (refer to FIGS. 1A and 1B). In this case, by opening or closing the route between the collection container 412 and the suction nozzle 406, the valve 410 controls a timing at which the ink is sucked by the suction nozzle 406. In this case, "controls a timing at which the ink is sucked by the suction nozzle 406" means, for example, that control is performed so that in a suction state the ink is sucked by the suction nozzle 406 at the time of flattening for flattening the layer of the ink by the flattening roller 202, and in a non-suction state in the ink is not sucked at a timing other than the time of flattening. In this case, it is preferable to make preparation by reducing the internal pressure of the collection container 412 before building is started so that the ink can be immediately sucked by opening the valve 410. In this case, for example, by opening the valve 410 at the same time as start of the building operation, the ink may be started to be sucked by the suction nozzle 406.

The collection container 412 is connected to the suction nozzle 406 via the ink suction route 408 and the valve 410 to receive and accumulate the ink sucked by the suction nozzle 406. Due to this, the collection container 412 functions as a container for scavenging the collected ink (waste liquid scavenging bin). In this example, the collection container 412 is also an example of the suction container, and is connected to the suction nozzle 406 in a state in which the internal pressure is reduced by sucking air by the pump 416 to cause the suction nozzle 406 to suck the ink. In this case, the collection container 412 can be considered to suction the material on the surface of the flattening roller 202 when the internal pressure thereof is reduced. In this example, the collection container 412 is connected to the pump 416 via the filter 414.

The filter 414 is a filter through which air passes between the collection container 412 and the pump 416, and traps the ink contained in air flowing from the collection container 412 to the suction nozzle 406. The pump 416 is a pump for reducing the internal pressure of the collection container 412, and reduces the internal pressure of the collection container 412 by sucking air in the collection container 412 via the filter 414. In this case, for example, the pump 416 exhausts the sucked air into the atmosphere. With this configuration, for example, the internal pressure of the collection container 412 can be appropriately reduced. Due to this, for example, the ink can be appropriately sucked by the suction nozzle 406.

In this example, as described above, air is sucked by the pump 416 to reduce the internal pressure of the collection container 412, and the ink is sucked by the suction nozzle 406 accordingly. On the other hand, considering only a case of sucking the ink by the suction nozzle 406, it seems that the suction nozzle 406 may be directly connected to the pump and the ink itself may be sucked by the pump. However, in a case of directly sucking liquid such as ink with the pump, failure may be easily caused in the pump, or a service life of the pump may be shortened, for example. On the other hand, in this example, the pump 416 sucks air, and a decompressed environment in the collection container 412 caused thereby is utilized to suck the ink. Thus, according to this example, for example, the pump 416 can be used more stably. Due to this, for example, failure and the like can be prevented from being caused in the pump 416, and the service life of the pump 416 can be appropriately prolonged.

In a case of using the pump 416 as in this example, as described above, the timing of sucking the ink can be controlled by opening or closing the valve 410. Thus, for example, the operation of the pump 416 may be in an ON state including a timing of not sucking the ink by the suction nozzle 406. For example, in a case in which more precise control is required to be performed, the pressure in the collection container 412 may be detected by a pressure sensor, and ON/OFF of the pump 416 may be controlled so that the pressure (negative pressure) in the collection container 412 falls within a certain range. In this example, the pump 416 can be considered to be a decompression module and the like for supplying a negative pressure to the suction nozzle 406, for example.

By using the ink removal unit 204 having the configuration as described above, according to this example, the ink can be sucked by the suction nozzle 406 arranged at a position separated from the flattening roller 202. Due to this, for example, the ink adhering to the surface of the flattening roller 202 can be appropriately removed while preventing another solid member from being brought into contact with the flattening roller 202. In this case, preventing the solid member from being brought into contact with the surface of the flattening roller 202 means, for example, preventing a solid member required for removing the ink adhering to the surface of the flattening roller 202 from being brought into contact with the surface of the flattening roller 202. Thus, the solid member used for a purpose other than the purpose of removing the ink adhering to the surface of the flattening roller 202 may be brought into contact with the surface of the flattening roller 202 as needed. The state of preventing the solid member from being brought into contact with the surface of the flattening roller 202 can be considered to be, for example, a state in which the ink removal unit 204 is arranged at a position separated from the flattening roller 202. In this case, the position of the ink removal unit 204 means a position of the solid member constituting the ink removal unit 204, for example.

As described above, in this example, by supplying the cleaning liquid using the cleaning nozzle 402 instead of simply sucking the ink by the suction nozzle 406, removal of the ink by suction is further facilitated. In this case, for example, the cleaning liquid is periodically dropped onto the surface of the flattening roller 202 by the cleaning nozzle 402. By performing suction by the suction nozzle 406 while causing the flattening roller 202 to rotate, the cleaning liquid is sucked together with the ink. With this configuration, for example, the ink can be appropriately removed while cleaning the flattening roller 202.

The operation of the ink removal unit 204 according to this example can be considered to be, for example, an operation of removing the ink from the surface of the flattening roller 202 by pouring fluid. In this case, pouring fluid means, for example, pouring fluid other than the ink. More specifically, in this example, the operation of sucking air by the pump 416 can be considered to be an example of an operation of pouring fluid, for example. The pump 416 can be considered to be an example of a flow channel formation unit. In this case, the flow channel formation unit means, for example, a configuration of forming a flow channel of fluid through which the fluid for removing the ink flows out or flows in so as to be able to remove the ink adhering to the flattening roller 202. The fluid for removing the ink means, for example, fluid used for removing the ink. In this example, a suction operation of the pump 416 can be considered to be an example of an operation of forming the flow channel of the fluid, for example. The operation of the ink removal unit 204 can be considered to be, for example, an operation of removing the ink from the flattening roller 202 without scraping off the ink from the flattening roller 202 by using the fluid that is caused to flow out or flow in by the flow channel formation unit.

In this example, the operation of supplying the cleaning liquid by the cleaning nozzle 402 can be considered to be an example of the operation of pouring the fluid, for example. In this case, the cleaning nozzle 402 can also be considered to be an example of the flow channel formation unit. In this case, for example, the operation of supplying the cleaning liquid by the cleaning nozzle 402 can also be considered to be an example of the operation of forming the flow channel of the fluid.

A specific configuration and an operation of the ink removal unit 204 are not limited to the configuration and the operation described above, and can be variously modified. For example, in the configuration illustrated in FIGS. 3A and 3B, the ink removal unit 204 includes two cleaning nozzles 402. However, the number of the cleaning nozzles 402 may be one or three or more. Depending on a characteristic of the ink to be used, quality required for building, and the like, the ink may be removed from the surface of the flattening roller 202 without using the cleaning liquid.

A position at which the ink is sucked by the suction nozzle 406 can be appropriately modified in a range in which the ink adhering to the flattening roller 202 can be appropriately sucked. In this case, it is especially preferable that the ink is sucked in an upper half region of the flattening roller 202 so that the position at which the ink is sucked is higher than the center of the flattening roller 202. To prevent omission of suction of the ink, for example, a plurality of suction nozzles 406 may be arranged along the rotational direction of the flattening roller 202. In this case, suction force of each of the suction nozzles 406 may be adjusted in the same degree. Suction forces of the suction nozzles 406 may be different from each other. To prevent clogging at a distal end and the like of the suction nozzle 406, for example, air may be jetted in a reverse direction at a timing when suction of the ink is not required, for example. In this case, a connection manner between the suction nozzle 406 and the pump 416 may be temporarily changed by using a three-way valve, for example.

Figure 4A:
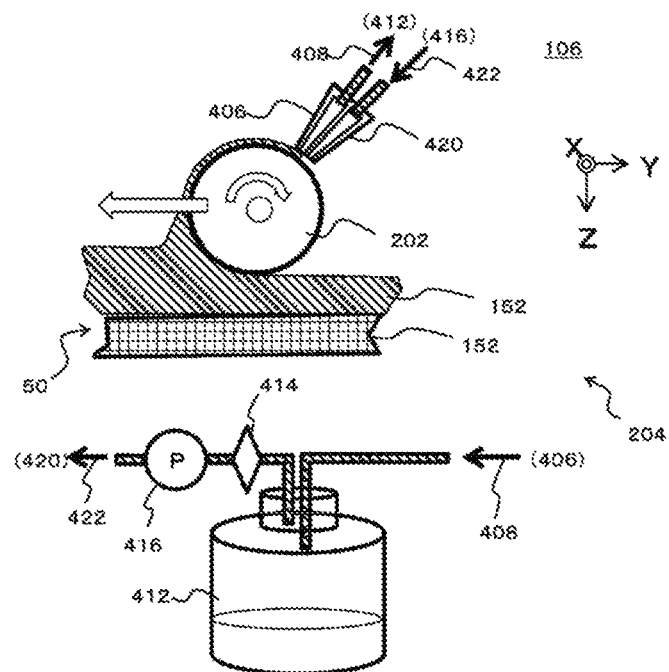
FIGS. 4A and 4B are diagrams for explaining a modification of the flattening unit 106.
Figure 4B:
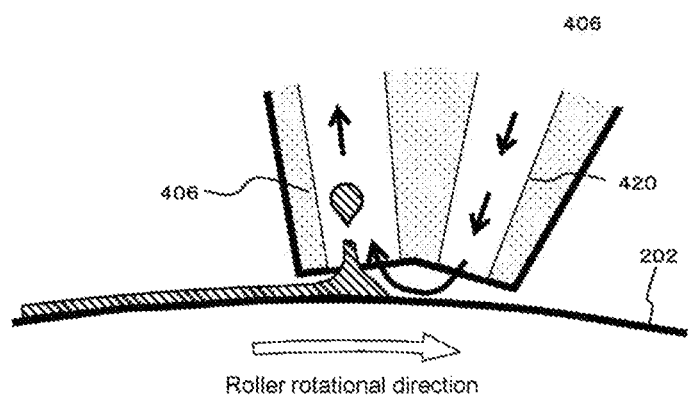

Subsequently, the following describes a modification and the like of the configuration of the flattening unit 106 in more detail. FIGS. 4A and 4B are diagrams for explaining a modification of the flattening unit 106. FIG. 4A illustrates an example of a configuration of the flattening unit 106 according to the present modification. FIG. 4B is a diagram illustrating a vicinity of the distal end of the suction nozzle 406 in an enlarged manner. Except the points described below, in FIGS. 4A and 4B, a component denoted by the same reference numeral as that in FIGS. 1A to 3B may have a characteristic that is the same as or similar to that of the component in FIGS. 1A to 3B.

Also in the present modification, the flattening unit 106 includes the flattening roller 202 and the ink removal unit 204. By functioning in a way that is the same as or similar to the flattening roller 202 having the configuration illustrated in FIGS. 3A and 3B, the flattening roller 202 flattens the layer of the ink. In the present modification, the ink removal unit 204 includes the suction nozzle 406, the ink suction route 408, the collection container 412, the filter 414, the pump 416, a blowing nozzle 420, and an air supply route 422. Among these components, the suction nozzle 406, the ink suction route 408, the collection container 412, the filter 414, and the pump 416 are components for removing the ink adhering to the surface of the flattening roller 202 by suction. By operating in a way that is the same as or similar to the configuration denoted by the same reference numeral in FIGS. 3A and 3B, these components remove the ink from the surface of the flattening roller 202.

In the configuration of the ink removal unit 204, the blowing nozzle 420 and the air supply route 422 are components for more appropriately sucking the ink by using the suction nozzle 406 and the like. Among these components, the blowing nozzle 420 is an example of a gas blowing unit, and blows pressurized gas (compressed air and the like) to the surface of the flattening roller 202 to move the ink on the surface of the flattening roller 202. More specifically, in the present modification, the blowing nozzle 420 is a nozzle for blowing compressed air like a known air knife, for example, and blows air to the flattening roller 202 from a position separated therefrom to move the ink by taking off the ink from the surface (outer peripheral surface) of the flattening roller 202 as illustrated in FIG. 4B, for example. In this case, the blowing nozzle 420 moves the ink on the surface of the flattening roller 202 so as to gather the ink to the vicinity of a suction position of the suction nozzle 406. In this case, as illustrated in FIG. 4B for example, the suction nozzle 406 sucks the ink moved by the air blown by the blowing nozzle 420. Thus, according to the present modification, the ink can be sucked by the suction nozzle 406 more efficiently and appropriately by sucking the ink while blowing air to the surface of the flattening roller 202.

In the present modification, the blowing nozzle 420 is connected to the pump 416 via the air supply route 422, and blows compressed air pressurized by the pump 416 to the surface of the flattening roller 202. In this case, the air supply route 422 is a flow channel of air connecting the pump 416 with the blowing nozzle 420. The pump 416 reduces the internal pressure of the collection container 412, and pressurizes the sucked air. The pressurized air is supplied to the blowing nozzle 420 via the air supply route 422. With this configuration, for example, air can be blown by the blowing nozzle 420 utilizing exhaust power of the pump 416. Due to this, for example, force of blowing air by the blowing nozzle 420 and suction force of the suction nozzle 406 can be easily and appropriately balanced. In this case, by using one pump 416 for suction and air blowing, the configuration of the ink removal unit 204 can be appropriately simplified.

The blowing nozzle 420 is preferably arranged at a position close to the flattening roller 202 and the suction nozzle 406. In this case, as illustrated in the drawing for example, the suction nozzle 406 and the blowing nozzle 420 are preferably arranged side by side along the rotational direction of the flattening roller 202. In this case, the suction nozzle 406 and the blowing nozzle 420 are preferably arranged so that the suction nozzle 406 is positioned on an upstream side and the blowing nozzle 420 is positioned on a downstream side in the rotational direction of the flattening roller 202. With this configuration, for example, the ink on the surface of the flattening roller 202 can be removed more securely. In the present modification, the operation of sucking air by the pump 416 and the operation of blowing air by the blowing nozzle 420 can be considered to be an example of the operation of pouring fluid. Thus, also in the present modification, the operation of the ink removal unit 204 can be considered to be an operation and the like of removing the ink from the surface of the flattening roller 202 by pouring fluid. In this case, the blowing nozzle 420 can be considered to be an example of the flow channel formation unit. In this case, the operation of blowing air by the blowing nozzle 420 can be considered to be an example of the operation of forming the flow channel of the fluid.

As a more specific operation of the ink removal unit 204 according to the present modification, for example, the pump 416 may be turned ON irrespective of the state of the flattening roller 202 at the time of building the object. With this configuration, for example, start of the operation of blowing air or the operation of sucking the ink can be appropriately prevented from being delayed. In this case, for example, the pump 416 may be always turned ON at the time of building operation by the building apparatus 10 (refer to FIGS. 1A and 1B), and the pump 416 may be turned OFF when the building apparatus 10 is in a standby state, for example. In the present modification, for example, by reducing the internal pressure of the collection container 412, the collection container 412 may be caused to function as a suction container. In this case, the collection container 412 may be caused to function as a pressure damper. In this case, for example, a pressure sensor is arranged inside the collection container 412, and the pressure in the collection container 412 is detected by the pressure sensor to control ON/OFF of the pump 416 so that the pressure (negative pressure) in the collection container 412 falls within a certain range. In this case, similar to the configuration of the ink removal unit 204 illustrated in FIGS. 3A and 3B, for example, it is more preferable to further arrange a valve between the collection container 412 and the suction nozzle 406.

As described above, in the present modification, the blowing nozzle 420 blows air to remove the ink to be moved from the surface of the flattening roller 202. Thus, for example, the blowing nozzle 420 can also be considered to be a separation member and the like for separating the ink adhering to the surface (peripheral surface) of the flattening roller 202. In this case, for example, the pump 416 can also be considered to be a pressure generation module and the like for supplying a positive pressure to the separation member.

The specific configuration of the ink removal unit 204 is not limited to the configuration described above, and may be further variously modified. For example, in the above description, mainly described is a configuration in a case of adjusting the force of blowing air by the blowing nozzle 420 and the suction force of the suction nozzle 406 in the same degree. However, in a further modification of the configuration of the ink removal unit 204, the force of blowing air by the blowing nozzle 420 and the suction force of the suction nozzle 406 may be intentionally caused to be different from each other. In this case, for example, the force of blowing air by the blowing nozzle 420 may be caused to be smaller than the suction force of the suction nozzle 406.

In the above description, mainly described is a configuration of blowing gas such as air by the blowing nozzle 420. However, in a further modification of the configuration of the ink removal unit 204, liquid may be blown by the blowing nozzle 420 instead of gas, for example. In this case, for example, the cleaning liquid may be blown by the blowing nozzle 420. Also with this configuration, the ink on the flattening roller 202 can be appropriately moved by using the blowing nozzle 420. Due to this, for example, the ink can be sucked by the suction nozzle 406 more appropriately. In this case, by blowing the cleaning liquid, the ink can be more securely removed from the surface of the suction nozzle 406, for example. In this case, the suction nozzle 406 may have a configuration also serving as a cleaning nozzle. In a further modification of the ink removal unit 204, a cleaning nozzle may be further arranged in addition to the blowing nozzle 420. In this case, for example, the cleaning nozzle may be arranged in a way that is the same as or similar to the cleaning nozzle 402 in the configuration illustrated in FIGS. 3A and 3B.

Subsequently, the following describes a positional relation between the flattening roller 202 and the ink removal unit 204 in more detail. As described above, in the ink removal unit 204 described above with reference to FIGS. 3A and 3B or FIGS. 4A and 4B, the ink is removed from the surface of the flattening roller 202 while preventing the solid member from being brought into contact with the surface of the flattening roller 202. However, in this case, if a distance (gap) between the suction nozzle 406 and the flattening roller 202 becomes too large, for example, the ink may be hardly removed with high accuracy. Thus, the gap between the distal end of the suction nozzle 406 and the outer peripheral surface of the flattening roller 202 is preferably in a range from about 10 to 100 μm, for example. In this case, a smaller gap is more preferable within this range. To retain such a small gap, a mechanism for retaining the gap (gap retaining mechanism) may be used.

Figure 5A:
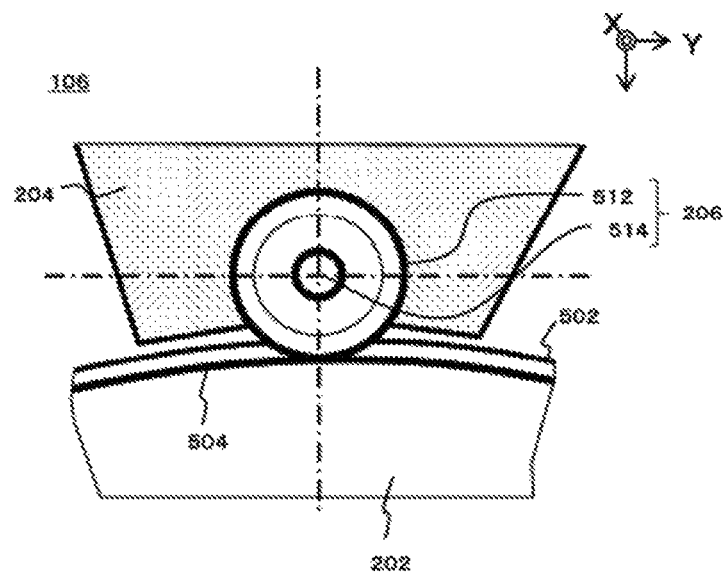
FIGS. 5A and 5B are diagrams for explaining a gap retaining mechanism 206.
Figure 5B:
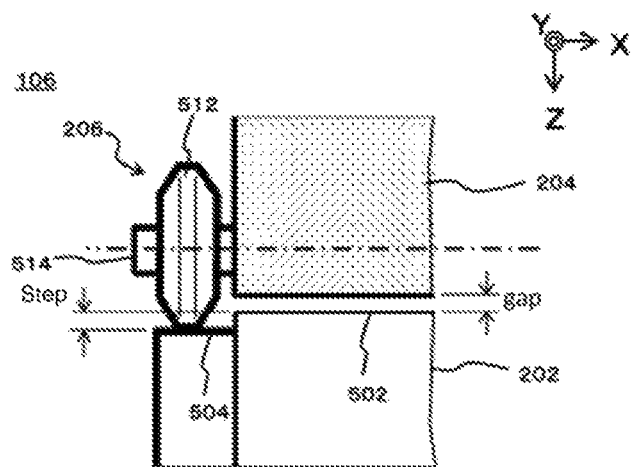

FIGS. 5A and 5B are diagrams for explaining a gap retaining mechanism 206, and illustrates an example of the configuration of the flattening unit 106 in a case of using the gap retaining mechanism 206. FIGS. 5A and 5B illustrate an example of a configuration of the vicinity of the gap retaining mechanism 206 in the flattening unit 106 viewed from respective directions parallel with the sub scanning direction and the main scanning direction. Except the points described below, in FIGS. 5A and 5B, a component denoted by the same reference numeral as that in FIGS. 1A to 4B may have a characteristic that is the same as or similar to that of the component in FIGS. 1A to 4B.

In the present modification, the flattening unit 106 further includes the gap retaining mechanism 206 in addition to the flattening roller 202 and the ink removal unit 204. The gap retaining mechanism 206 is a mechanism that retains the position of the ink removal unit 204 at a position separated from a portion of the flattening roller 202 to be brought into contact with the object being built. In the present modification, the flattening roller 202, is a roller having a step on the outer peripheral surface is used. More specifically, as illustrated in the drawing, the flattening roller 202 includes an object contact part 502 and a stepped part 504. The object contact part 502 is a portion of the flattening roller 202 to be brought into contact with the object being built. For example, the object contact part 502 can be considered to be a portion constituting an outermost circumference of the flattening roller 202. The stepped part 504 is a stepped region formed on a side of the object contact part 502 on the outer peripheral surface of the flattening roller 202. For example, the stepped part 504 can be considered to be a portion stepped from the object contact part 502 not to be brought into contact with the object being built. Although not illustrated in the drawing, in the present modification, the stepped part 504 is, for example, formed on both sides (both sides in the sub scanning direction) of the object contact part 502.

In the present modification, the gap retaining mechanism 206 includes a plurality of rollers 512 for adjusting a gap and a plurality of pins 514. In this case, the roller 512 for adjusting a gap is a roller used for adjusting the position of the ink removal unit 204. The position of the center of each roller 512 for adjusting a gap is fixed to the ink removal unit 204 with the pin 514 as illustrated in the drawing, for example. The respective rollers 512 for adjusting a gap are arranged such that the outer peripheral surface thereof is brought into contact with the stepped part 504 on one side and the other side of the ink removal unit 204 in the sub scanning direction. With this configuration, for example, the position of the ink removal unit 204 is determined in accordance with a position of a rotation center of the roller 512 for adjusting a gap.

In this case, when the flattening roller 202 rotates at the time of flattening the layer of the ink, the roller 512 for adjusting a gap rotates while being in contact with the stepped part 504 of the flattening roller 202. In this case, in the roller 512 for adjusting a gap, the center position supported by the pin 514 is retained at a fixed position. In this case, the position of the ink removal unit 204 is retained at a position separated from the object contact part 502 as a portion of the flattening roller 202 to be brought into contact with the object being built. Thus, according to the present modification, for example, the position of the ink removal unit 204 can be appropriately retained. Due to this, for example, positions of the suction nozzle 406 and the blowing nozzle 420 in the ink removal unit 204 can be appropriately adjusted. In this case, by using the flattening roller 202 including the stepped part 504, for example, the ink can be appropriately prevented from adhering to a region of the flattening roller 202 with which the roller 512 for adjusting a gap is brought into contact. Due to this, for example, it is possible to appropriately prevent an error and the like from being caused in adjusting the position of the ink removal unit 204 due to influence of the ink adhering to the flattening roller 202.

Depending on accuracy and the like required for building, for example, the flattening roller 202 not including the stepped part 504 may be used. In this case, for example, the roller 512 for adjusting a gap may be arranged to be in contact with the outer peripheral surface of the flattening roller 202. Also in this case, depending on required accuracy and the like, the position of the ink removal unit 204 can be appropriately adjusted. In the present modification, in a case of using the roller 512 for adjusting a gap and the like, the roller 512 for adjusting a gap is a solid member that is brought into contact with the flattening roller 202. However, in this case, it can be considered that the roller 512 for adjusting a gap is a member used for adjusting the position of the ink removal unit 204, and is not a solid member directly required for removing the ink adhering to the surface of the flattening roller 202. In this case, the solid member directly required for removing the ink, for example, is a member that is brought into contact with the ink at the time of removing the ink. The solid member directly required for removing the ink can be considered to be, for example, a solid member and the like for moving the ink adhering to the surface of the flattening roller 202 without using another solid member.

Subsequently, regarding a case of using the ink removal unit 204 including the blowing nozzle 420, supplementary explanation for the blowing nozzle 420, explanation of a further modification, and the like will be made. FIGS. 6A to 6D are diagrams for explaining a characteristic of the blowing nozzle 420 in more detail. The blowing nozzle 420 illustrated in FIGS. 6A to 6D is, for example, the blowing nozzle 420 in the ink removal unit 204 described above with reference to FIGS. 4A and 4B, for example.

Figure 6A:
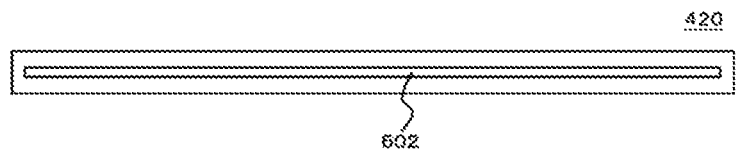
FIGS. 6A to 6D are diagrams for explaining a characteristic of a blowing nozzle 420 in more detail.
Figure 6B:
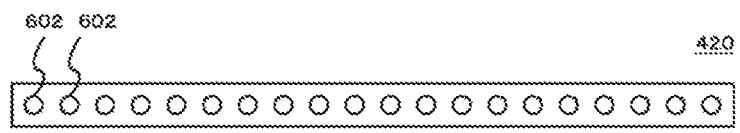

FIGS. 6A and 6B illustrate an example of a detailed configuration of the blowing nozzle 420. As described above, the blowing nozzle 420 is a nozzle for blowing compressed air like an air knife, for example. In this case, the blowing nozzle 420 is, as illustrated in FIG. 6A for example, a nozzle including a slit-like outlet 602 can be preferably used. In this case, for example, the blowing nozzle 420 includes one outlet 602 as illustrated in the drawing. The blowing nozzle 420 is, for example, a configuration including a plurality of outlets 602 may be used. In this case, the blowing nozzle 420 includes the outlets 602 arranged side by side in a longitudinal direction of the blowing nozzle 420. Also with this configuration, by arranging the outlets 602 side by side at sufficiently small intervals, compressed air can be appropriately blown like an air knife and the like.

Figure 6C:
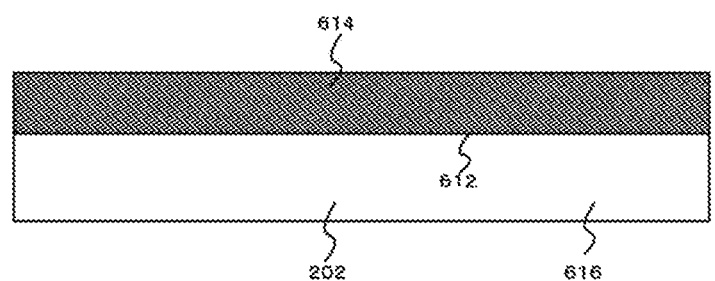
Figure 6D:
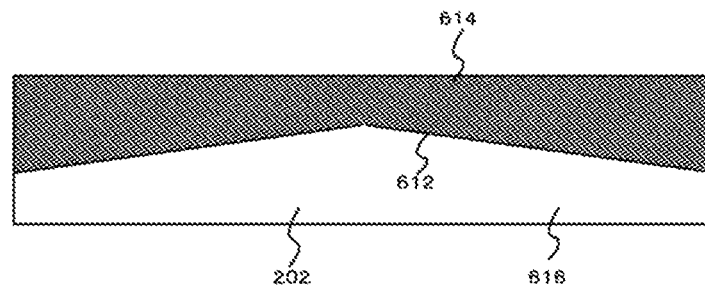

FIGS. 6C and 6D are diagrams for explaining an effect of blowing air by the blowing nozzle 420. In a case of using the blowing nozzle 420 having the configuration as described above, the ink on the flattening roller 202 can be moved by blowing compressed air to the surface of the flattening roller 202. In this case, when the ink on the flattening roller 202 is moved, a boundary 612, an unremoved region 614, and a removed region 616 are formed on the flattening roller 202 as illustrated in the drawing. In this case, the boundary 612 is a boundary between the unremoved region 614 and the removed region 616. The unremoved region 614 is a region in which the ink is left on the flattening roller 202. The removed region 616 is a region in which the ink is removed on the flattening roller 202 because the ink is moved when air is blown by the blowing nozzle 420.

In this case, the shape of the boundary 612 is determined, for example, in accordance with the configuration of the outlet 602 in the blowing nozzle 420. More specifically, for example, in a case of using the blowing nozzle 420 including the outlet 602 having a straight slit shape as illustrated in FIG. 6A, or in a case of using the blowing nozzle 420 in which the outlets 602 are arranged on a straight line as illustrated in FIG. 6B, the boundary 612 between the unremoved region 614 and the removed region 616 becomes a linear shape as illustrated in FIG. 6C, for example. In a modification of the configuration of the blowing nozzle 420, the blowing nozzle 420 including the slit-like outlet 602 having a shape other than a straight line, the blowing nozzle 420 in which the outlets 602 are arranged on a line other than the straight line, and the like may be used in place of the configuration illustrated in FIGS. 6A and 6B, for example. In this case, the boundary 612 between the unremoved region 614 and the removed region 616 becomes a non-linear shape as illustrated in FIG. 6D, for example. More specifically, FIG. 6D illustrates an example of a case in which the boundary 612 having a broken-line shape is formed such that a center portion thereof in the rotational direction of the flattening roller 202 becomes the most upstream side and both ends thereof become the most downstream side.

In the above description, described is various modifications of the ink removal unit 204 mainly in a case of using the blowing nozzle 420 in combination with the suction nozzle 406 (refer to FIGS. 3A and 3B) that sucks the ink. However, in a further modification of the configuration of the ink removal unit 204, for example, the blowing nozzle 420 may be used in a configuration of not sucking the ink by the suction nozzle 406. Also in this case, for example, the blowing nozzle 420 moves the ink on the surface of the flattening roller 202 by blowing compressed air and the like. In this case, instead of using the suction nozzle 406, the ink may be removed from the surface of the flattening roller 202 by moving the ink to a predetermined collection position or collection route, for example. More specifically, for example, in a case of blowing air as illustrated in FIG. 6D, the ink may be collected by being caused to flow out from both ends of the boundary 612 to the outside of the flattening roller 202. Also with this configuration, the building material adhering to the surface of the flattening roller 202 can be appropriately removed.

In the above description, mainly described are the configuration and the operation in a case of removing the ink while preventing the solid member from being brought into contact with the surface of the flattening roller 202 by sucking the ink. However, in a case of using the blowing nozzle 420 in a configuration of not sucking the ink by the suction nozzle 406, for example, removal of ink may be facilitated by blowing gas. In this case, if a blade and the like are used, for example, the ink can be removed from the surface of the flattening roller 202 without bringing the blade into contact with the flattening roller 202 with strong force. Due to this, for example, a problem can be appropriately prevented from being caused in a case of using a blade and the like in a conventional configuration. Thus, in a case of using the blowing nozzle 420 in a configuration of not sucking the ink by the suction nozzle 406, the ink may be removed by using the blade and the like. In the above description, mainly described is a case in which the configuration of using the cleaning liquid is combined with the suction nozzle 406 for sucking the ink. However, if a blade and the like are used in a case of using the cleaning liquid, for example, the ink can be easily removed from the surface of the flattening roller 202 without bringing the blade into contact with the flattening roller 202 with strong force. Thus, in a case of using the cleaning liquid, for example, the ink may be removed by using a blade and the like with the configuration of not sucking the ink by the suction nozzle 406.

INDUSTRIAL APPLICABILITY

The present invention can be preferably applied to a building apparatus, for example.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A building apparatus for building a three-dimensional (3D) object by depositing a layer formed with a building material in a deposition scanning direction set in advance, the building apparatus comprising:
   an ejection head, configured to eject the building material;
   a scanning driver, configured to cause the ejection head to perform a scanning operation of moving relative to the 3D object being built, and cause the ejection head to perform the scanning operation in an in-plane direction orthogonal to the deposition scanning direction to cause the ejection head to form the layer;
   a flattening member, configured to flatten a surface of the layer by being brought into contact with the surface of the layer and scraping off the building material; and
   an adhering material removal unit, configured to remove, from the flattening member, the building material that is scraped off by the flattening member,
   wherein the adhering material removal unit includes a flow channel formation unit, configured to form a flow channel of fluid for enabling removal of the building material adhering to the flattening member by causing the fluid for removing the building material to flow in or flow out through the flow channel, and the building material is removed from the flattening member without scraping off the building material from the flattening member by using the fluid caused to flow out or flow in by the flow channel formation unit,
   the flattening member is a flattening roller that flattens the layer by rotation,
   the adhering material removal unit further comprises:
      a suction nozzle, configured to suck the building material on the surface of the flattening roller, and
      a gas blowing unit, configured to blow pressurized air to the surface of the flattening roller to move the building material on the surface of the flattening roller,
      wherein the suction nozzle sucks the building material moved by the pressurized air blown by the gas blowing unit, and sends the building material to a suction container, and
      the gas blowing unit is positioned at a downstream side of the suction nozzle in a rotation direction of the flattening roller, and
      the gas blowing unit is configured to blow pressurized air to the surface of the flattening roller member from a position separated from the flattening roller.

2. The building apparatus according to claim 1, wherein the adhering material removal unit sucks the building material from a position separated from the flattening roller.

3. The building apparatus according to claim 1, wherein the adhering material removal unit comprises:
   the flow channel formation unit, serving as a pump, configured to suck air; and
   the suction container, an internal pressure of which is reduced when the pump sucks air, configured to suck the building material on the surface of the flattening roller when the internal pressure is reduced.

4. The building apparatus according to claim 1, wherein the pump reduces the internal pressure of the suction container and pressurizes the sucked air, and
   the gas blowing unit blows the pressurized air pressurized by the pump to the surface of the flattening roller.

5. The building apparatus according to claim 1, wherein the adhering material removal unit comprises a liquid supplying unit, configured to supply a liquid matched with a characteristic of the building material for lowering viscosity of the building material to the surface of the flattening roller from a position separated from the flattening roller.

6. The building apparatus according to claim 1, wherein the building apparatus further comprising:
   a gap retaining mechanism, configured to retain a position of the adhering material removal unit at a position separated from a portion of the flattening roller to be brought into contact with the 3D object being built,
   wherein the flattening roller comprises:
      an object contact part that is a portion to be brought into contact with the 3D object being built; and
      a stepped part that is a portion stepped from the object contact part not to be brought into contact with the 3D object being built,
   wherein the gap retaining mechanism comprises a roller for adjusting a gap that is a roller used for adjusting a position of the adhering material removal unit,
   wherein the position of the adhering material removal unit is determined in accordance with a position of a rotation center of the roller for adjusting a gap, and
   wherein the roller for adjusting a gap rotates while being in contact with the stepped part of the flattening roller to retain the position of the adhering material removal unit at a position separated from the portion of the flattening roller to be brought into contact with the 3D object being built.

7. A building method for building a three-dimensional (3D) object, wherein the building is performed using the building apparatus according to claim 1.

8. A building apparatus for building a three-dimensional (3D) object by depositing a layer formed with a building material in a deposition scanning direction set in advance, the building apparatus comprising:
   an ejection head, configured to eject the building material;
   a scanning driver, configured to cause the ejection head to perform a scanning operation of moving relative to the 3D object being built, and cause the ejection head to perform the scanning operation in an in-plane direction orthogonal to the deposition scanning direction to cause the ejection head to form the layer;
   a flattening member, configured to flatten a surface of the layer by being brought into contact with the surface of the layer and scraping off the building material; and
   an adhering material removal unit, configured to remove, from the flattening member, the building material that is scraped off by the flattening member,
   wherein the adhering material removal unit sucks the building material on a surface of the flattening member from a position separated from the flattening member to remove the building material from the surface of the flattening member,
   the flattening member is a flattening roller that flattens the layer by rotation,
   the adhering material removal unit further comprises:
   a suction nozzle, configured to suck the building material on the surface of the flattening roller, and
   a gas blowing unit, configured to blow pressurized air to the surface of the flattening roller to move the building material on the surface of the flattening roller,
   wherein the suction nozzle sucks the building material moved by the pressurized air blown by the gas blowing unit, and sends the building material to a suction container, and the gas blowing unit is positioned at a downstream side of the suction nozzle in a rotation direction of the flattening roller, and the gas blowing unit is configured to blow pressurized air to the surface of the flattening roller member from a position separated from the flattening roller.

9. A building apparatus for building a three-dimensional (3D) object by depositing a layer formed with a building material in a deposition scanning direction set in advance, the building apparatus comprising:

an ejection head, configured to eject the building material;

a scanning driver, configured to cause the ejection head to perform a scanning operation of moving relative to the 3D object being built, and cause the ejection head to perform the scanning operation in an in-plane direction orthogonal to the deposition scanning direction to cause the ejection head to form the layer;

a flattening member, configured to flatten a surface of the layer by being brought into contact with the surface of the layer and scraping off the building material; and an adhering material removal unit, configured to remove, from the flattening member, the building material that is scraped off by the flattening member, wherein the adhering material removal unit comprises a gas blowing unit, configured to blow pressurized air to a surface of the flattening member from a position separated from the flattening member, and wherein the gas blowing unit moves the building material on the surface of the flattening member by blowing pressurized air to remove the building material from the surface of the flattening member, the flattening member is a flattening roller that flattens the layer by rotation, the adhering material removal unit further comprises:

a suction nozzle, configured to suck the building material on the surface of the flattening roller, and a gas blowing unit, configured to blow pressurized air to the surface of the flattening roller to move the building material on the surface of the flattening roller, wherein the suction nozzle sucks the building material moved by the pressurized air blown by the gas blowing unit, and sends the building material to a suction container, and the gas blowing unit is positioned at a downstream side of the suction nozzle in a rotation direction of the flattening roller, and the gas blowing unit is configured to blow pressurized air to the surface of the flattening roller member from a position separated from the flattening roller.

10. A building apparatus for building a three-dimensional (3D) object by depositing a layer formed with a building material in a deposition scanning direction set in advance, the building apparatus comprising:

an ejection head, configured to eject the building material;

a scanning driver, configured to cause the ejection head to perform a scanning operation of moving relative to the 3D object being built, and cause the ejection head to perform the scanning operation in an in-plane direction orthogonal to the deposition scanning direction to cause the ejection head to form the layer;

a flattening member, configured to flatten a surface of the layer by being brought into contact with the surface of the layer and scraping off the building material; and an adhering material removal unit, configured to remove, from the flattening member, the building material that is scraped off by the flattening member, wherein the adhering material removal unit comprises a liquid supplying unit, configured to supply a liquid matched with a characteristic of the building material that lowers viscosity of the building material to a surface of the flattening member from a position separated from the flattening member, the flattening member is a flattening roller that flattens the layer by rotation, the adhering material removal unit further comprises:

a suction nozzle, configured to suck the building material on the surface of the flattening roller, and a gas blowing unit, configured to blow pressurized air to the surface of the flattening roller to move the building material on the surface of the flattening roller, wherein the suction nozzle sucks the building material moved by the pressurized air blown by the gas blowing unit, and sends the building material to a suction container, and the gas blowing unit is positioned at a downstream side of the suction nozzle in a rotation direction of the flattening roller, and the gas blowing unit is configured to blow pressurized air to the surface of the flattening roller member from a position separated from the flattening roller.

* * * * *